Sept. 20, 1955     O. FRIEDRICHS     2,718,137
MASONRY SILO
Filed April 7, 1951     2 Sheets-Sheet 1
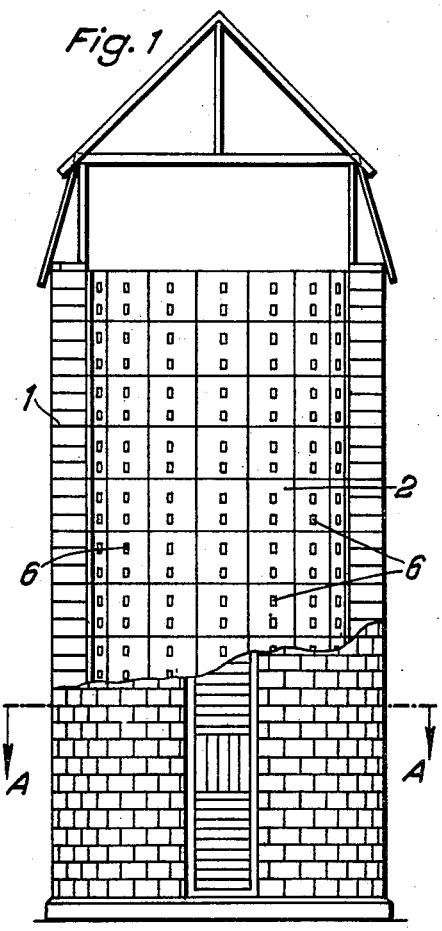
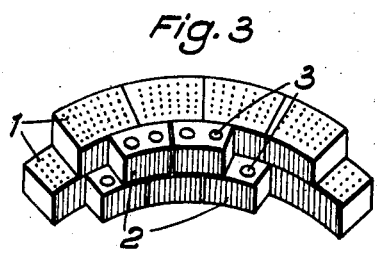
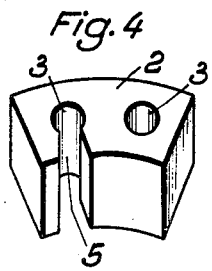 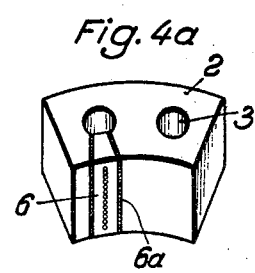
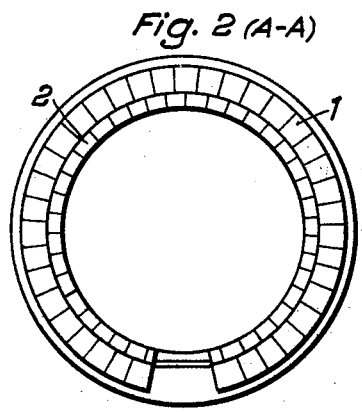
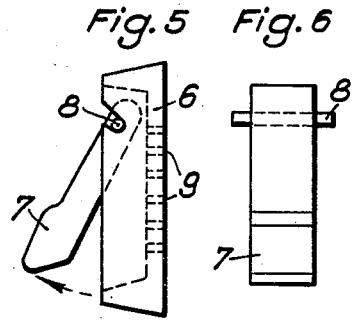
*Inventor:*
OTTO FRIEDRICHS
By
*AGENT*

Sept. 20, 1955    O. FRIEDRICHS    2,718,137
MASONRY SILO
Filed April 7, 1951    2 Sheets-Sheet 2
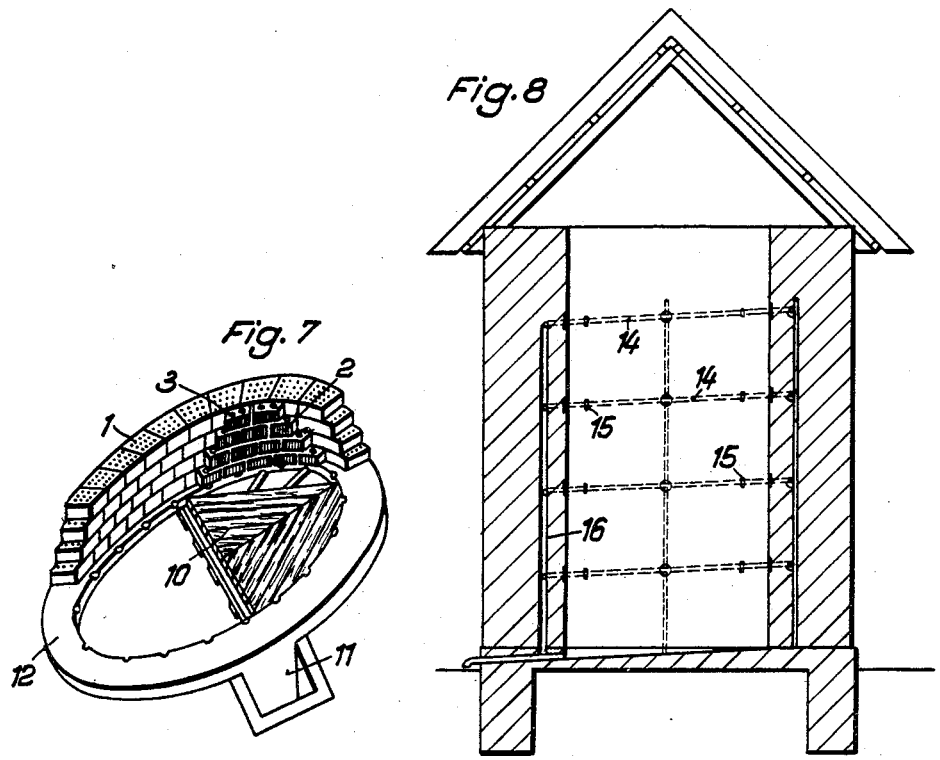
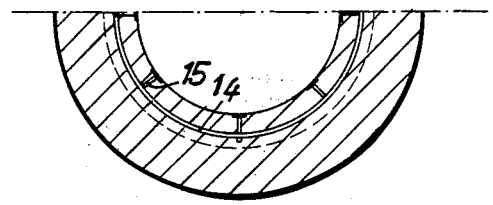
Inventor:
OTTO FRIEDRICHS
By
AGENT

United States Patent Office 2,718,137
Patented Sept. 20, 1955

2,718,137

MASONRY SILO

Otto Friedrichs, Rosenheim, Germany, assignor of one-half to Josef Reitstötter, Munich, Germany Application April 7, 1951, Serial No. 219,829

1 Claim. (Cl. 72—6)

The invention relates to a plant for removing sap from lofts, silos, especially lofts for green food and for de-aerating same, allowing on the one hand to store the green food in a silo and on the other hand to obtain the sap pressed out of the stored green food in the silo separated from the food itself which sap may be used up as fodder with its full nutritive value.

In silos constructed of wood, according to one feature of the invention, the stretching rings may be designed to form discharge pipes for the sap pressed out and the air; the sap may, however, also be removed by vertical tubes or channels. With silos constructed of cement or stones the last mentioned method is advisable. Hereby the pressed sap may be removed in many different heights of the tower silo without requiring special devices therefor. The result of the invention is independent of the special construction of the silo, it consists in a stepwise draining when the food is stored so that more food may be stored within the silo itself. Especially the forming of acetic acid in the sap is prevented and care is taken for removing the air (carbonic acid) and finally the full development of the lactic acid bacteria present in the food is reached, whereby preserving lactic acid is produced and therewith the full nutritive value of the silo contents is maintained. Furthermore by the discharge means provided according to the invention the pressure against the side walls in the interior of the silo is avoided in consequence of the gases and liquids being allowed to flow off, so that a very remarkable saving of building material is possible. The gases and the sap are discharged through valves leading into the discharge tubes.

In known constructions of silos manufactured of wood which is also adapted for building tower or high silos the silo wall consists of planks or deals joined by means of grooves and tongues which are held together by means of stretching rings consisting of round iron hoops and turn-buckles, and, therefore, are watertightly and airtightly closed.

In contradistinction to these older constructions, according to the invention, the stretching rings form pipe lines which are in connection with the filling tube, preferably by a valve such as a ball valve. Thereby it has become possible to discharge the sap pressed out during the storing in different heights of the silo and to use it separately from the stored food.

As known, the strong natural pressure existing in such high silos creates conditions warranting a highly valuable preservation and causing the production of considerable quantities of sap as a by-product which must be removed to secure a good preservation. This sap may be used up as fodder with its full nutritive value in the natural state.

The construction of the high silo in its details is not a subject of the present invention. It may be of any known manner provided that there are means adapted to discharge the sap pressed out and the gases produced in the silo during the silo process, said discharging means being provided with or without valves.

By the construction of the discharging means according to the invention the pressure against the walls in the interior of the silo is removed so that the entire construction of the silo becomes lighter whereby a considerable saving of building material results.

The drawings show schematically embodiments of the invention by way of example.

Fig. 1 is a front view of, and partially a section through a high silo constructed of hollow bricks.

Fig. 2 is a section through Fig. 1 according to the line A—A.

Fig. 3 illustrates the manner of building a wall of a silo of hollow bricks.

Fig. 4 is a perspective view of a special hollow brick of the inner layer of a silo wall adapted to receive a valve.

Fig. 4a is a similar view, the valve being inserted.

Fig. 5 is a side view of a valve for discharging sap and air according to the invention.

Fig. 6 is a side view of the flap of the valve shown in Fig. 5.

Fig. 7 is a perspective view of the lower part of a silo with courses of bricks and Figs. 8 and 9 show a modified construction of the silo.

In Figs. 1 to 3 and 7 the wall of a silo is shown consisting of two courses of hard baked bricks, an outer wall 1 of hard baked radially perforated bricks and an inner wall 2 of acidproof clinker hollow or perforated bricks as to be seen in Figs. 2, 3 and 7. The special clinker hollow or perforated bricks of the inner wall 2 are provided with one or a plurality of tubular hollow rooms 3, generally two of such rooms instead of which also angular channels may be used. The single bricks of the inner wall are blocked up suchwise that the left hand tubular hollow room of the upper brick aligns with the right hand tubular hollow room of the lower brick or vice versa so that continuous hollow channels or shafts 3 result opening to the bottom plate 10 of the silo (Fig. 7).

According to the invention, special hollow bricks (Fig. 4) are inserted into the inner wall provided with a recess 5 adapted to receive a discharge valve 6 (Fig. 5). Fig 4a shows the valve 6 inserted into the said recess a layer 6a of packing material being inserted between the walls of the recess and the valve body. Special bricks according to Fig. 2 are arranged in distances of about 50 cm. in the vertical as well as in the horizontal direction.

The discharge valve is preferably made of acidproof material, it consists of a hollow or recessed valve body 6 the wall of which facing the interior of the silo is provided with openings 9. At the opposite side of the valve body facing the tubular hollow room 3 the side walls of the valve body are provided with recesses adapted to receive a pivot 8 passing the valve flap 7. The flap may rock, as to be seen in Fig. 5. The lower part of the flap 7 is thickened whereby this part has an increased weight.

As soon as an increased pressure results in the silo by the accumulated sap, air and fermentation gases and also by the natural pressure of the stored food, the mixture of sap, air and gases passes from the inner of the silo into the recessed or hollow part of the valve body, through the openings 9. The mixture presses against the valve flap 7 and opens it until the pressure is balanced whereupon the flap returns to its seat in consequence of its own weight and closes the discharging into the hollow room 3.

During the time in which the flap is opened the mixture of sap, air and gases enters into the hollow room 3 where the sap separates from the air and the gases. The sap flows downwardly over the bottom plate 10 into the collecting tank 11 while the mixture of air and gases flows upwardly through the hollow room 3 and escapes over the roof of the silo.

According to a modified construction the valve body 6 may be dispensed with and the inner wall of the hollow brick 2 may be provided with openings or one opening closed in the inner of the brick by the valve flap. In this case recesses are provided in the interior of the brick adapted to receive the pivot 8 suchwise that it covers the mentioned opening or openings of the wall in its normal position but clears them if an increased pressure results in the interior of the silo thereby connecting it with the hollow room 3. This modification is a considerable reduction in price of the discharge valve for discharging the mixture of sap, air and gases from the interior of the silo.

The invention is not restricted to the embodiment shown in Figs. 1 to 7 of the drawing, but may be used in connection with every other construction of silos, it may also be realized in many other kinds. Thus, for instance, in silos consisting of bricks discharging tubes 14 or shafts may be provided suitably embedded into the walls and connected by opening 15 with the inside of the silo as schematically shown in Fig. 8. Also in combination with other towers such as cooling towers, corn-lofts and the like the new arrangement may be advantageously used. It is not necessary to arrange the tubes 14 horizontally or nearly horizontally as shown in Fig. 8 and to provide them with a special discharging pipe 16 provided with a valve. The wall of the silo may be formed, independently of the material of which it is built, suchwise that a horizontal tube plant is dispensed with at all and only vertical discharging tubes are provided running downwardly from each valve.

The essential matter of the invention is that means are provided such as tubes, shafts or any other discharging elements extending over the whole height of the silo wall adapted to discharge the mixture of sap, air and gases downwardly along the inner or the outer side of said wall, of course also in the middle of the silo a tube system provided with valves may be built in through which the sap and the air escapes.

Having thus particularly described the nature of my said invention and the manner in which the same is to be performed what I wish to have covered by Letters Patent is:

A silo which allows the draining of green silage while preventing the access of air, said silo comprising in combination, an outer wall consisting of hard baked radially perforated bricks, an inner wall consisting of special clinker hollow bricks provided with at least one tube-like hollow room and laid suchwise that continuous vertical channels result draining the mixture of sap, air and gases accumulated in the interior of the silo, spaced recesses in said inner wall to provide communication between said vertical channels and the interior of the silo, discharging valves embedded in said recesses, said valves comprising a recessed valve body provided with perforations opening into the interior of the silo and a valve flap rockably suspended on the valve body, and being adapted to be opened by a pressure within the silo and to be closed by its own weight.

References Cited in the file of this patent
UNITED STATES PATENTS

| | | |
|---|---|---|
| 1,968,680 | Grothaus | July 31, 1934 |
| 2,345,204 | Lodwig | Mar. 28, 1944 |
| 2,410,338 | Crane | Oct. 29, 1946 |